US010313885B2

(12) United States Patent
Boyle et al.

(10) Patent No.: US 10,313,885 B2
(45) Date of Patent: Jun. 4, 2019

(54) SYSTEM AND METHOD FOR AUTHENTICATION IN DISTRIBUTED COMPUTING ENVIRONMENT (71) Applicant: SMART Technologies ULC, Calgary (CA)

(72) Inventors: Michael Boyle, Calgary (CA); Lynel Barrow, Calgary (CA); Brent Adam, Calgary (CA); Roberto Sirotich, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 0 days.

(21) Appl. No.: 15/827,258

(22) Filed: Nov. 30, 2017

(65) Prior Publication Data

US 2018/0084428 A1 Mar. 22, 2018

Related U.S. Application Data (62) Division of application No. 14/467,104, filed on Aug. 25, 2014, now Pat. No. 9,872,178.

(51) Int. Cl.
H04L 29/06 (2006.01)
H04W 12/08 (2009.01)

(52) U.S. Cl.
CPC ......... *H04W 12/08* (2013.01); *H04L 63/0861* (2013.01); *H04L 63/102* (2013.01)

(58) Field of Classification Search
CPC . H04L 63/0861; H04L 63/102; H04L 67/303; H04W 12/08
See application file for complete search history.

(56) References Cited

U.S. PATENT DOCUMENTS

| 5,448,263 A | 9/1995 | Martin |
| 6,141,000 A | 10/2000 | Martin |
| 6,337,681 B1 | 1/2002 | Martin |
| 6,747,636 B2 | 1/2004 | Martin |
| 6,803,906 B1 | 10/2004 | Morrison et al. |
| 7,232,986 B2 | 6/2007 | Worthington et al. |
| 7,236,162 B2 | 6/2007 | Morrison et al. |
| 7,274,356 B2 | 9/2007 | Ung et al. |

(Continued)

FOREIGN PATENT DOCUMENTS

| WO | 2011/085486 A1 | 7/2011 |
| WO | 2011/094855 A1 | 8/2011 |
| WO | 2013/104054 A1 | 7/2013 |

OTHER PUBLICATIONS

International Search Report and the Written Opinion of the International Searching Authority for International Application No. PCT/CA2013/000015 dated Mar. 25, 2013.

*Primary Examiner* — Baotran N To
(74) *Attorney, Agent, or Firm* — King & Schickli, PLLC (57) ABSTRACT The present invention relates to a method and system for managing profiles for use with touch systems. A user logs into a communal device using a pointer paired with a mobile device. The communal device is authenticated and retrieves the user's profile. The user profile is used to setup a workspace on the communal device. The workspace is granted access to the user's content on a content server. When the communal device has multiple users, each workspace may be shared or not depending on the user's requirements. Each pointer is individually identified to a particular user and workspace.

18 Claims, 8 Drawing Sheets

(56) References Cited

U.S. PATENT DOCUMENTS

| | | |
|---|---|---|
| 9,872,178 B2 * | 1/2018 | Boyle .................. H04L 63/0861 |
| 2003/0065626 A1 * | 4/2003 | Allen .................... G06F 19/328 |
| | | 705/76 |
| 2004/0179001 A1 | 9/2004 | Morrison et al. |
| 2005/0259084 A1 | 11/2005 | Popovich et al. |
| 2005/0275638 A1 | 12/2005 | Kolmykov-Zotov et al. |
| 2006/0010400 A1 | 1/2006 | Dehlin et al. |
| 2006/0023922 A1 * | 2/2006 | Black ................. G06K 9/00154 |
| | | 382/115 |
| 2007/0262964 A1 | 11/2007 | Zotov et al. |
| 2008/0077673 A1 * | 3/2008 | Thomas .................. H04L 51/24 |
| | | 709/206 |
| 2009/0143141 A1 | 6/2009 | Wells et al. |
| 2010/0039234 A1 * | 2/2010 | Soliven .................... H04B 5/02 |
| | | 340/10.1 |
| 2010/0045705 A1 | 2/2010 | Vertegaal et al. |
| 2010/0149096 A1 | 6/2010 | Migos et al. |
| 2011/0043480 A1 | 2/2011 | Popovich et al. |
| 2011/0185437 A1 * | 7/2011 | Tran ...................... H04L 63/104 |
| | | 726/28 |
| 2012/0113241 A1 | 5/2012 | Sundresan et al. |

\* cited by examiner

SYSTEM AND METHOD FOR AUTHENTICATION IN DISTRIBUTED COMPUTING ENVIRONMENT

FIELD OF THE INVENTION

The present invention relates generally to profile management and authentication. More particularly, the present invention relates to a method and system for managing profiles for use with touch systems.

BACKGROUND OF THE INVENTION

With the increased popularity of distributed computing environments and smart phones, it is becoming increasingly unnecessary to carry multiple devices. A single device can provide access to all of a user's information, content, and software. Software platforms can now be provided as a service remotely through the Internet. User data and profiles are now stored in the "cloud" using services such as Facebook®, Google Cloud storage, Dropbox®, Microsoft OneDrive®, or other services known in the art. One problem encountered with smart phone technology is that users frequently do not want to work primarily on their smart phone due to their relatively small screen size and/or user interface.

This frustration is exasperated when other more suitable interactive input devices are readily available such as interactive whiteboards, displays such as high-definition televisions (HDTVs), projectors, conventional keyboards, etc. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; 7,274,356; and 7,532,206 assigned to SMART Technologies ULC of Calgary, Alberta, Canada, assignee of the subject application, the entire disclosures of which are incorporated by reference; touch systems comprising touch panels or tables employing electromagnetic, capacitive, acoustic or other technologies to register pointer input; laptop and tablet personal computers (PCs); smartphones, personal digital assistants (PDAs) and other handheld devices; and other similar devices.

U.S. Pat. No. 7,532,206 to SMART Technologies ULC, the entirety of the specification incorporated by reference, discloses a touch system and method that differentiates between different passive pointers used to contact a touch surface so that pointer position data generated in response to a pointer contact with the touch surface can be processed in accordance with the type of pointer used to contact the touch surface. The touch system comprises a touch surface to be contacted by a passive pointer and at least one imaging device having a field of view looking generally across the touch surface. At least one processor communicates with the at least one imaging device and analyzes images acquired by the at least one imaging device to determine the type of pointer used to contact the touch surface and the location on the touch surface where pointer contact is made. The determined type of pointer and the location on the touch surface where the pointer contact is made are used by a computer to control execution of an application program executed by the computer.

United States Patent Publication No. 2011/0242060 to SMART Technologies ULC, the entirety of the specification incorporated by reference, discloses an interactive input system having at least one imaging assembly that captures image frames of a touch region. A pointer placed within the touch region modulates an emitted infrared light using a different combination of subcarrier frequencies that are captured in the image frames. A processing structure demodulates the captured image frames to determine frequency components thereof and examines the frequency components to determine at least one attribute of the pointer.

U.S. Patent Publication No. 2014/0137015 titled "Method and Apparatus for Manipulating Digital Content", the entirety of the specification incorporated by reference, assigned to SMART Technologies ULC discloses an interactive input system having a pen tool whereby removal of the pen tool from the tool tray conditions the DSP controller to check if a modulated signal is output by the pen tool. If no modulated signal from the pen tool has been received, the controller simply remains in a ready state awaiting such a modulated signal. When the pen tool is brought into contact with the display surface, the pen tool emits a modulated signal that is received by the wireless unit connected to the DSP. The DSP checks to determine whether a specific attribute has been assigned to the pen tool, for example colour, or whether a default attribute has been assigned to the pen tool. The DSP controller then uses the modulated signal-to-pen tool mode mapping to determine whether the writing end or erasing end of the pen tool has been used to contact the display surface.

U.S. Pat. No. 6,498,590 to Dietz and further described in Dietz et al., "DiamondTouch: A multi-user touch technology," Proc. User Interface Software and Technology (UIST) 2001, pp. 219-226, 2001 discloses a multi-user touch system including a surface on which are a pattern of mounted antennas. A transmitter transmits uniquely identifiable signals to each antenna. Receivers are capacitively coupled to different users, the receivers are configured to receive the uniquely identifiable signals. A processor then associates a specific antenna with a particular users when multiple users simultaneously touch any of the antennas. Through identifying particular users, the system has the ability to generate virtual personal work areas. Although the system is designed for group collaboration on a common surface, in practice, individuals may want to "break away" to briefly address some subset of the problem, and then wish to integrate their result into the whole. When these situations arise, the system can generate a virtual personal work area in front of the appropriate user that only responds to that user. The user can then manipulate objects in this space, without impacting the larger work effort of other users but for the loss of some screen space. Because these virtual personal work areas are software defined, they can be generated and destroyed on the fly, in any shape as desired.

Many models of interactive whiteboards sold by SMART Technologies ULC under the name SMARTBoard™ that employ machine vision technology to register pointer input have a tool tray mounted below the interactive whiteboard surface that comprises receptacles or slots for holding a plurality of pen tools as well as an eraser tool. These tools are passive devices without a power source or electronics. When a tool is removed from its slot in the tool tray, a sensor in the tool tray detects the removal of that tool allowing the interactive whiteboard to determine that the tool has been selected. SMARTBoard™ software in turn processes the next contact with the interactive whiteboard surface as an action from the selected pen tool, whether the contact is from the selected pen tool or from another pointer such as a finger or other object. Similarly, when the eraser tool is removed from its slot, the SMARTBoard™ software processes the next contact with the interactive whiteboard surface as an erasing action, whether the contact is from the eraser tool, or from another pointer such as a finger or other object. Additionally, two buttons are provided on the tool tray. One of the buttons, when pressed, allows the user to execute typical "right click" mouse functions, such as copy, cut, paste, select all, etc. while the other button when pressed causes an onscreen keyboard to be displayed on the interactive whiteboard surface allowing users to enter text, numbers, etc. Although this existing tool tray provides satisfactory functionality, it is desired to improve and expand upon such functionality.

It is an object of the invention described herein to identify the user interacting with the interactive input device. It is a further object of the invention to provide an improved method and system of authenticating and sharing data of a user between distributed computing devices.

SUMMARY OF THE INVENTION

According to one aspect of the invention, there is provided a method for profile management comprising the steps of: transmitting identification information from a pointer to a mobile device and matching the identification information to a database of predetermined identification information. On a match, transmitting login information from the mobile device to the pointer and contacting the pointer to a communal device to transmit the login information to the communal device. The communal device is authenticated with an authentication server using at least a portion of the login information.

According to another aspect of the invention, the authentication server notifies a profile server on successful authentication of the communal device and profile information is transmitted from the profile server to the authenticated communal device. A workspace is generated on the communal device from at least a portion of the profile information and a pointer identifier is registered with the workspace. The communal device is automatically logged into at least one content server using a portion of the profile information; and accesses user content therefrom.

In another aspect of the invention, the identification information is produced from generating biometric data from a biometric sensor located on the pointer. The biometric data is processed to generate a biometric template.

According to another aspect of the invention, a communal computing system comprises: a processor; a first communication channel; a second communication channel; a memory unit comprising instructions to configure the processor to: receive login information on contact of a pointer to the first communication channel; the pointer previously authenticated with a mobile device. The communal device is authenticated with an authentication server over the second communication channel using at least a portion of the login information; and receives profile information over the second communication channel from a profile server.

According to another aspect of the invention, the memory unit further comprises instructions to configure the processor to: generate a workspace on the communal computing system using at least a portion of the profile information and register a pointer identifier with the workspace. The communal computing system is automatically logged into at least one content server using a portion of the profile information and accessing user content from the at least one content server. The first communication channel may be a wireless communication channel that initiates communication using contact. The second communication channel is a wired communication channel.

According to another aspect of the invention, a method for profile management comprising the steps of: generating biometric data from a biometric sensor located on a pointer; processing the biometric data using a processor to generate a biometric template; and matching the biometric template to a database of predetermined biometric templates. On a match, transmitting login information over a first communication channel from a mobile device to the pointer. On contacting the pointer to a communal device, login information is transmitted over the first communication channel to the communal device. The communal device is authenticated with an authentication server over a second communication channel using at least a portion of the login information and the authentication server notifies a profile server on successful authentication. Profile information is transmitted over the second communication channel from the profile server to the communal device.

In another aspect of the invention, the processor processing the biometric data may be located in the pointer, the mobile device, the communal device, or the authentication server.

According to another aspect of the invention, the biometric template is transmitted over the first communication channel to the mobile device.

Another aspect of the invention involves the matching being performed using a mobile device processor.

According to another aspect of the invention, a workspace is generated on the communal device at least a portion of the profile information and a pointer identifier is registered with the workspace.

In another aspect of the invention, the communal device is automatically logged in to at least one content server using a portion of the profile information and the user content is accessed by the communal device from the content server(s).

BRIEF DESCRIPTION OF THE DRAWINGS

An embodiment will now be described, by way of example only, with reference to the attached Figures, wherein.

DETAILED DESCRIPTION OF THE EMBODIMENT

While the Background of Invention described above has identified particular problems known in the art, the present invention provides, in part, a new and useful application for profile management that extend beyond those systems.

Figure 1:
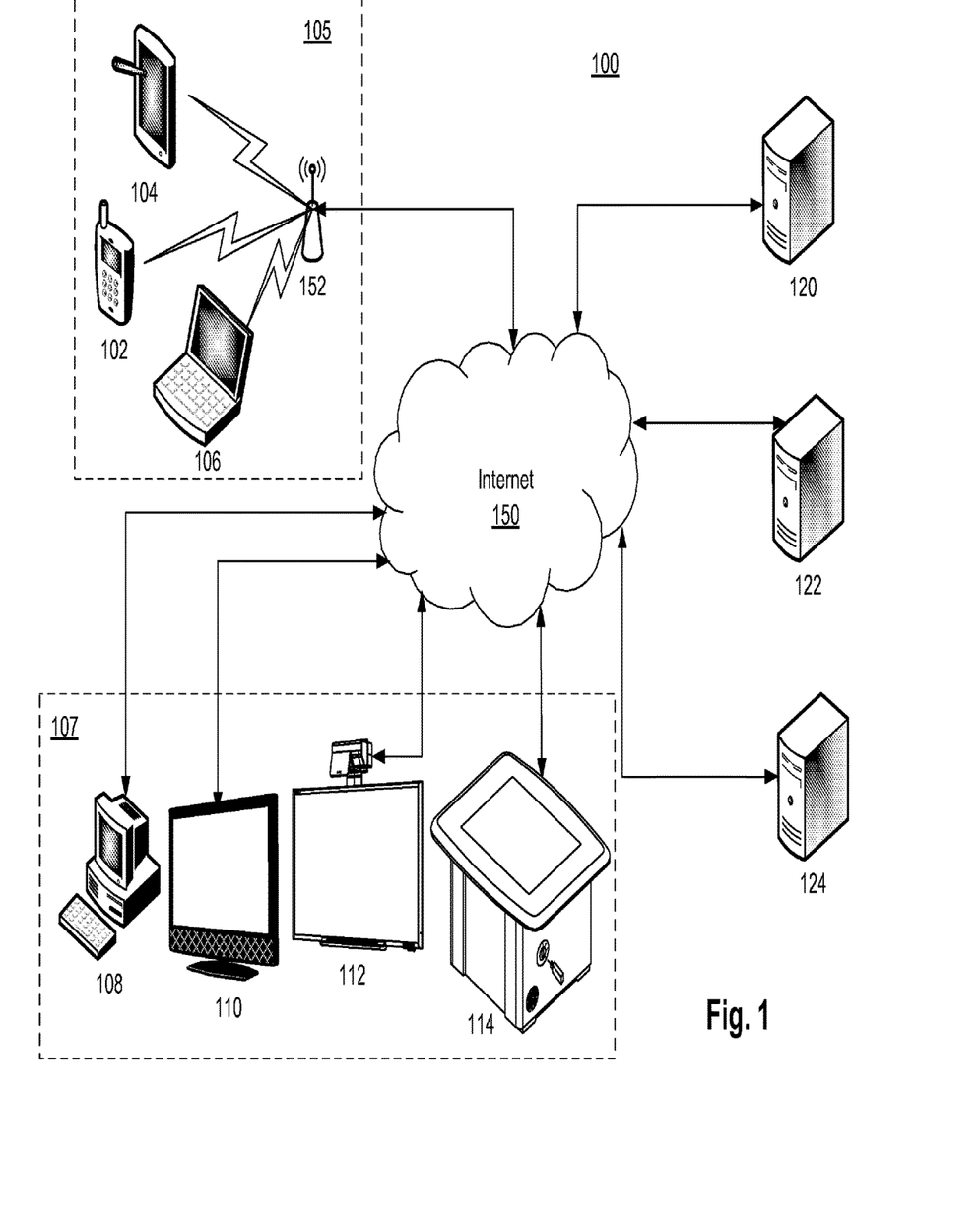
FIG. 1 shows a high-level architecture of a system or managing a user profile on a plurality of diverse devices.

FIG. 1 demonstrates a high-level hardware architecture 100 of the present embodiment. A user has a mobile device 105 such as a smartphone 102, a tablet computer 104, or laptop 106 that is in communication with a wireless access point 152 such as 3G, LTE, WiFi, Bluetooth®, near-field communication (NFC) or other wireless communication channels known in the art. The wireless access point 152 allows the mobile devices 105 to communicate with other devices over the Internet 150. In addition to the mobile devices 105, a plurality of communal devices 107 such as a personal computer 108, a smart flat screen display 110, an interactive whiteboard 112, or an interactive table 114 are also connected to the Internet 150. The system comprises an authentication server 120, a profile server 122, and a content server 124.

Figure 2:
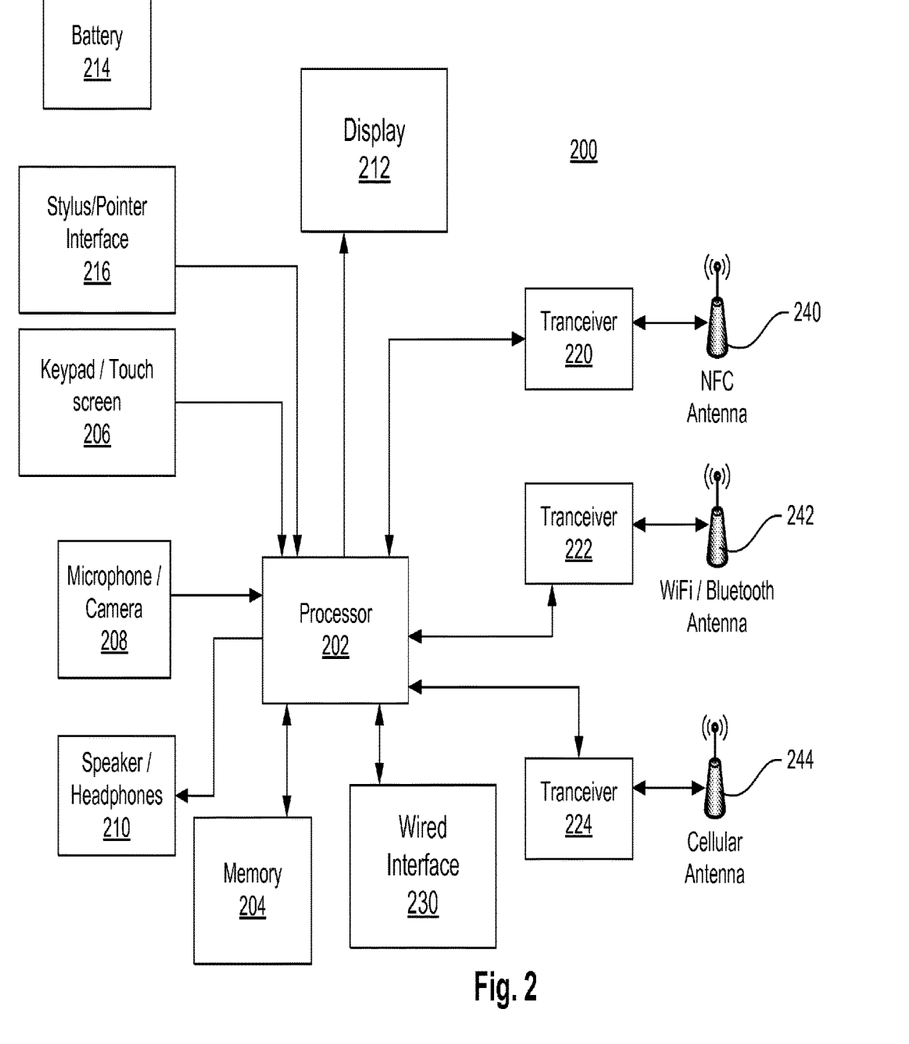
FIG. 2 shows an architecture of a mobile device that may be used to implement various parts of the invention.

The components of an exemplary mobile device 200 is further disclosed in FIG. 2 having a processor 202 executing instructions from volatile or non-volatile memory 204 and storing data thereto. The mobile device 200 has a number of human-computer interfaces such as a keypad or touch screen 206, a microphone and/or camera 208, a speaker or headphones 210, and a display 212. The mobile device has a battery 214 supplying power to all the components within the device. The battery 214 may be charged using a wired or wireless charging.

The keyboard 206 could be a conventional keyboard found on most laptop computers or a soft-form keyboard constructed of flexible silicone material. The keyboard 206 could be a standard-sized 101-key or 104-key keyboard, a laptop-sized keyboard lacking a number pad, a handheld keyboard, a thumb-sized keyboard or a chorded keyboard known in the art. Alternatively, the mobile device 200 could have only a virtual keyboard displayed on the display 212 and uses a touch screen 206. The touch screen 206 can be any type of touch technology such as analog resistive, capacitive, projected capacitive, ultrasonic, infrared grid, camera-based (across touch surface, at the touch surface, away from the display, etc), in-cell optical, in-cell capacitive, in-cell resistive, electromagnetic, time-of-flight, frustrated total internal reflection (FTIR), diffused surface illumination, surface acoustic wave, bending wave touch, acoustic pulse recognition, force-sensing touch technology, or any other touch technology known in the art. The touch screen 206 could be a single touch or multi-touch screen. Alternatively, the microphone 208 may be used for input into the mobile device 200 using voice recognition.

The display 212 is typically small-size between the range of 1.5 inches to 14 inches to enable portability and has a resolution high enough to ensure readability of the display 212 at in-use distances. The display 212 could be a liquid crystal display (LCD) of any type, plasma, e-Ink®, projected, or any other display technology known in the art. If a touch screen 206 is present in the device, the display 212 is typically sized to be approximately the same size as the touch screen 206. The user controls the information displayed on the display 212 using either the touch screen or the keyboard 206. Alternatively, the mobile device 200 may not have a display 212 and rely on sound through the speakers 210 or other display devices to present information.

The mobile device 200 has a number of network transceivers coupled to antennas for the processor to communicate with other devices. For example, the mobile device 200 may have a near-field communication (NFC) transceiver 220 and antenna 240; a WiFi®/Bluetooth® transceiver 222 and antenna 242; a cellular transceiver 224 and antenna 244 where at least one of the transceivers is a pairing transceiver used to pair devices. The mobile device 200 optionally also has a wired interface 230 such as USB or Ethernet connection.

Software residing in memory 204 and executing on the processor 202 provides a stylus/pointer interface 216. When a pointer is brought into contact with the NFC antenna 240, the pointer 400 identifies itself as such to the pointer interface 216. The pointer interface 216 requests the public key of the pointer 400 and a biometric template corresponding to the user holding the pointer 400. The pointer interface 216 compares the biometric template to the preexisting template stored in memory 204. If a successful match is found, the pointer interface 216 transmits login information to the pointer 400. This is further discussed in reference to FIGS. 5A to 5D below.

Turning now to the communal devices 107 and further described with reference to FIG. 3. The exemplary communal device 300 also has a processor 302 executing instructions from volatile or non-volatile memory 304 and storing data thereto. The communal device 300 has a number of human-user interfaces such as a keypad or touch screen 306, a microphone and/or camera 308, a speaker or headphones 310, and a display 312. A wired power supply 314 provides power to all the components of the communal device 300.

The communal device 300 has a keyboard or touch screen 306, and display 312 that are typically more fully-featured than that of the mobile device 200. For example, the keyboard 306 may be sized for the user permitting them to type at an increased speed. Another example is that the touch screen 306 and display 312 may be larger than that of the mobile device 200 or have increased functionality such as being a multi-user, multi-touch screen. The keypad 306 could be a conventional keyboard found on most desktop computers or a soft-form keyboard constructed of flexible silicone material. The keyboard 306 could be a standard-sized 101-key or 104-key keyboard, a laptop-sized keyboard lacking a number pad, a handheld keyboard, a thumb-sized keyboard or a chorded keyboard known in the art. Alternatively, the communal device 300 could have only a virtual keyboard displayed on a touch screen 306. The touch screen 306 can be any type of touch technology such as analog resistive, capacitive, projected capacitive, ultrasonic, infrared grid, camera-based (across touch surface, at the touch surface, away from the display, etc), in-cell optical, in-cell capacitive, in-cell resistive, electromagnetic, time-of-flight, frustrated total internal reflection (FTIR), diffused surface illumination, surface acoustic wave, bending wave touch, acoustic pulse recognition, force-sensing touch technology, or any other touch technology known in the art. The touch screen 306 could be a single touch, a multi-touch screen, or a multi-user, multi-touch screen. Alternatively, the microphone 308 may be used for input into the communal device 300 using voice recognition.

The display 312 is typically a large-sized display for either presentation or collaboration with group of users. The resolution is sufficiently high to ensure readability of the display 312 by all participants. If a touch screen 306 is present in the device, the display 312 is typically sized to be approximately the same size as the touch screen 306. The user(s) controls the information displayed on the display 312 using either the touch screen or the keyboard 306.

The communal device 300 has a number of network transceivers coupled to antennas for the processor to communicate with other devices. For example, the communal device 300 may have a near-field communication (NFC) transceiver 320 and antenna 340, and/or a WiFi®/Bluetooth® transceiver 322 and antenna 342. The communal device also may have a wired network adapter 324 such as Ethernet to communicate with the Internet 150. The communal device may have a wired interface 330 such as USB for connection to and communication with other devices such as the mobile device 200. For example, a SMART Room System™ typically found in meeting rooms or SMART kapp™ produced by SMART Technologies, assignee of the present application.

Figure 4A:
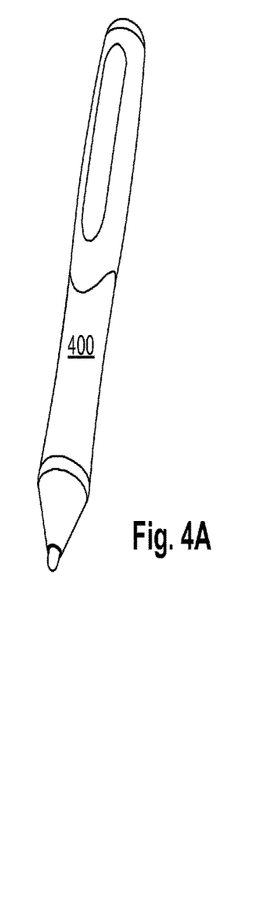
FIGS. 4A and 4B show a pointer and an architecture of the pointer for an interactive input system.
Figure 4B:
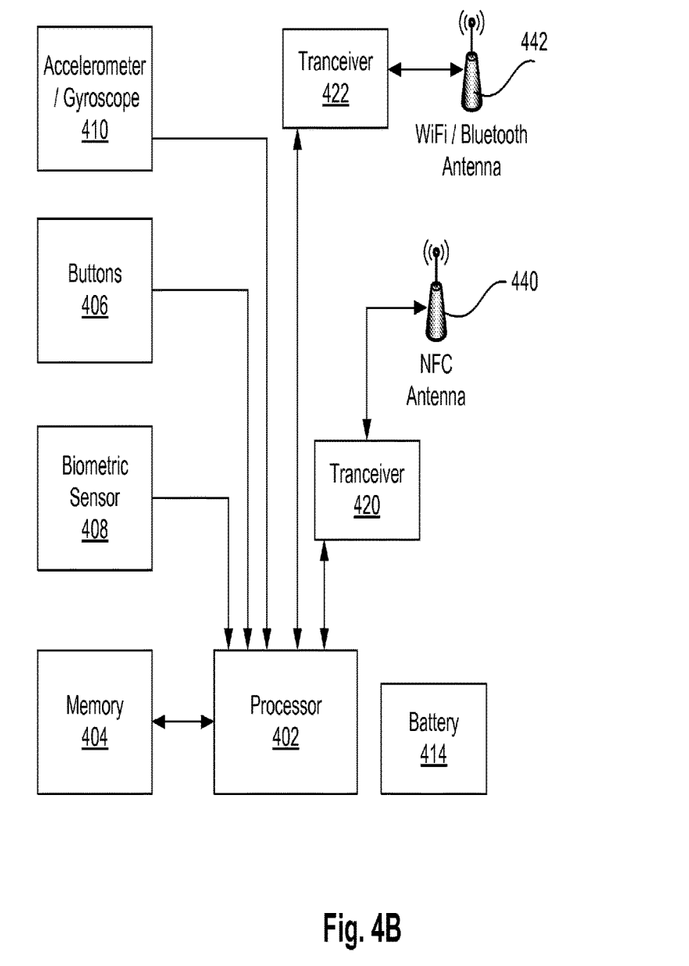

A pointer 400 of the present embodiment is shown in FIGS. 4A and 4B. The pointer 400 has a processor 402 executing instructions from volatile or non-volatile memory 404 and storing data thereto. A battery 414 supplies power to all the components of the pointer 400 and may be rechargeable or non-rechargeable and replaceable. The pointer may have buttons 406 allowing the user to change characteristics of the pointer 400 such as virtual ink colour, style, or to initiate pairing between the pointer and a particular mobile device 200 or communal device 300. The pointer 400 also may have a biometric sensor 408 such as a fingerprint scanner, iris scanner, voice recognition, facial recognition, electrocardiogram signal recognition, electromyogram signal recognition, electroencephalogram signal recognition, signature/handwriting recognition, vein recognition, or any combination thereof. In the instance of a fingerprint scanner, the biometric sensor 408 may be located on the barrel of the pointer 400 corresponding to where the user typically grips the pointer 400. The fingerprint scanner may also scan a plurality of fingers to identify the user. The pointer 400 may also have an accelerometer and/or gyroscope 410 which may be used for signature/handwriting recognition as well as to improve general handwriting recognition. Moreover, the accelerometer/gyroscope 410 may also be used to improve the quality of the digital ink based on the pitch, yaw, and/or rotation of the pointer 400. The pressure on the pointer 400 could also be used to modulate the thickness of the digital ink. The pointer 400 has a transceiver 420 coupled to an NFC antenna 440 for pairing and communicating between the pointer 400 and a particular mobile device 200 or a particular communal device 300. Furthermore, the pointer 400 has a transceiver 422 coupled to a WiFi or Bluetooth antenna 442 in order to communicate accelerometer/gyroscope 410, button 406, biometric sensor 408, or battery status information to the communal device 300. The pointer 400 has a unique identifier stored within the memory 404 thereof.

Figure 3:
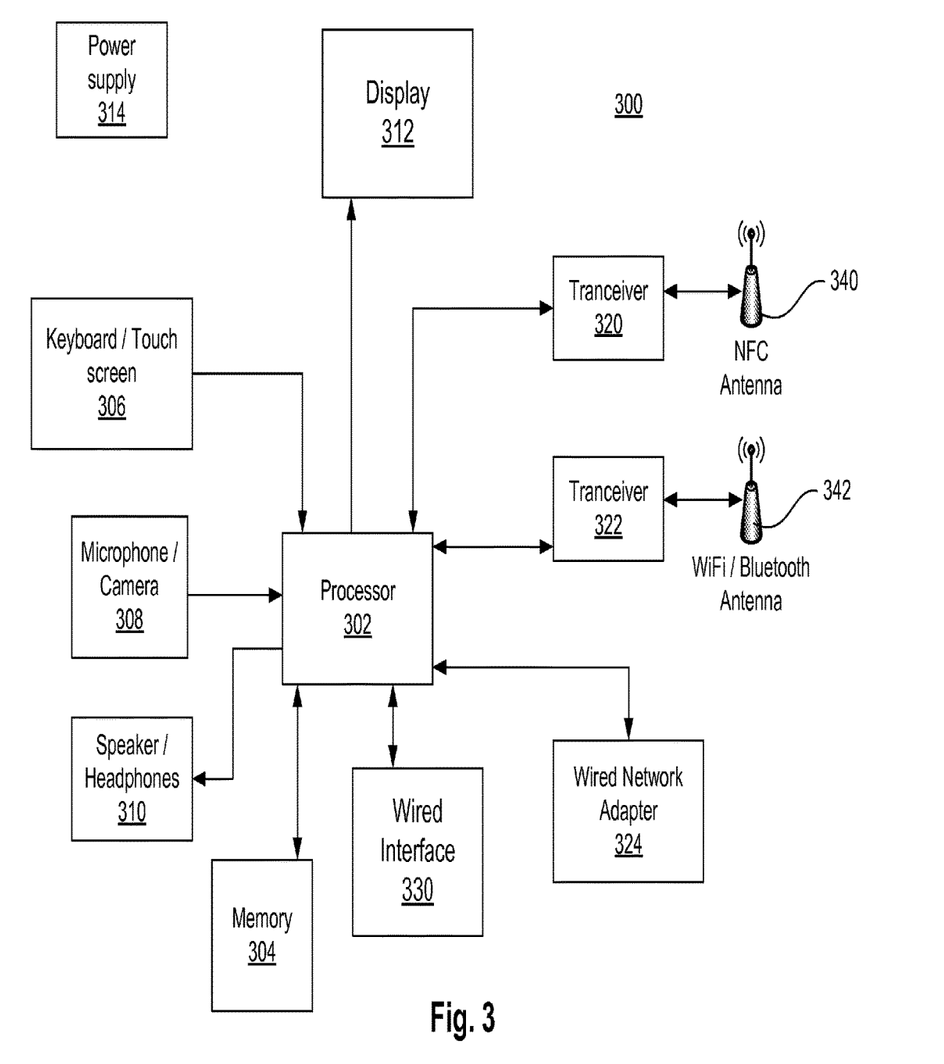
FIG. 3 shows an architecture of a computer system that may be used to implement various parts of the invention.

The servers 120, 122, 124 of the present embodiment have a similar structure to that described in FIG. 3 with respect to the communal device 300. The servers 120, 122, 124 have a processor 302 executing instructions from volatile or non-volatile memory 304 and storing data thereto. The servers 120, 122, 124 may or may not have a keyboard 306, display 312, or wireless transceivers and antennae. The servers 120, 122, 124 communicate over the Internet 150 using the wired network adapter 324 to exchange information necessary for the profile management of the present invention.

Figure 5A:
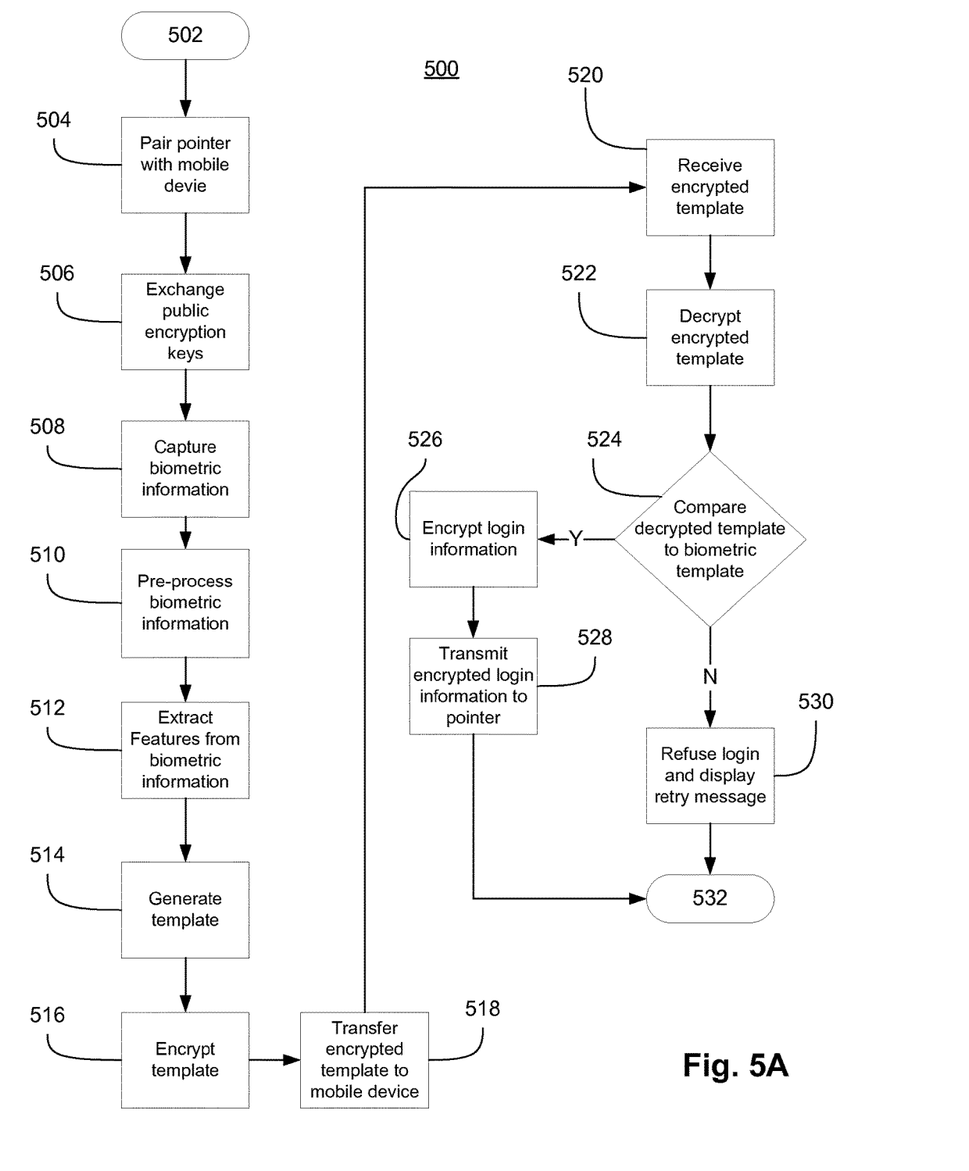
FIGS. 5A to 5D show flowcharts demonstrating a profile management algorithm.

An overview of the process 500 for the present embodiment is shown in FIG. 5A and starts at step 502. At Step 504, the pointer 400 is paired with the mobile device 200 using NFC by placing the pointer 400 proximate to the NFC antenna 240. Following pairing, the mobile device 200 and the pointer 400 exchange public encryption keys with each other (step 506). A biometric sensor on the pointer captures biometric information from the user (step 508), pre-processes the biometric information (step 510), extracts features (step 512), and generates a template (step 514). The template is encrypted by an encryption engine (step 516) executing on the processor 402 in the pointer 400 using the public key of the mobile device 200. The encrypted template is transferred to the mobile device 200 from the pointer 400 using the NFC transceiver 420 and antenna 440 (step 518).

The mobile device 200 receives the encrypted template over the NFC antenna 240 and transceiver 220 (step 520). A decryption engine executing on the processor 202 decrypts the encrypted template using the private key of the mobile device 200 (step 522). A matching engine then compares the decrypted template to the user's biometric template stored in the memory 204 of the mobile device 200 (step 524). If the decrypted template matches the user's biometric template, the pointer, and by consequence the user, is authenticated with the mobile device 200, otherwise a refuse login and retry message is displayed (step 530). An encryption engine executing on the processor 202 of the mobile device 200 encrypts login information (step 526) comprising: user information (such as a username, password), user account identifier, pointer identifier, address of a authentication server 120 used to authenticate access to the user's full-profile, network security protocol and network service, using the public key of the pointer 400. The user information (e.g. username and password) may be encrypted using the public key of the authentication server 120 prior to encrypting using the public key of the pointer 400. This prohibits exposing the password and username to the pointer 400 or the communal device 300. The encrypted user information is then transmitted to the pointer 400 using the NFC transceiver 220 and antenna 240 (step 528).

Figure 5B:
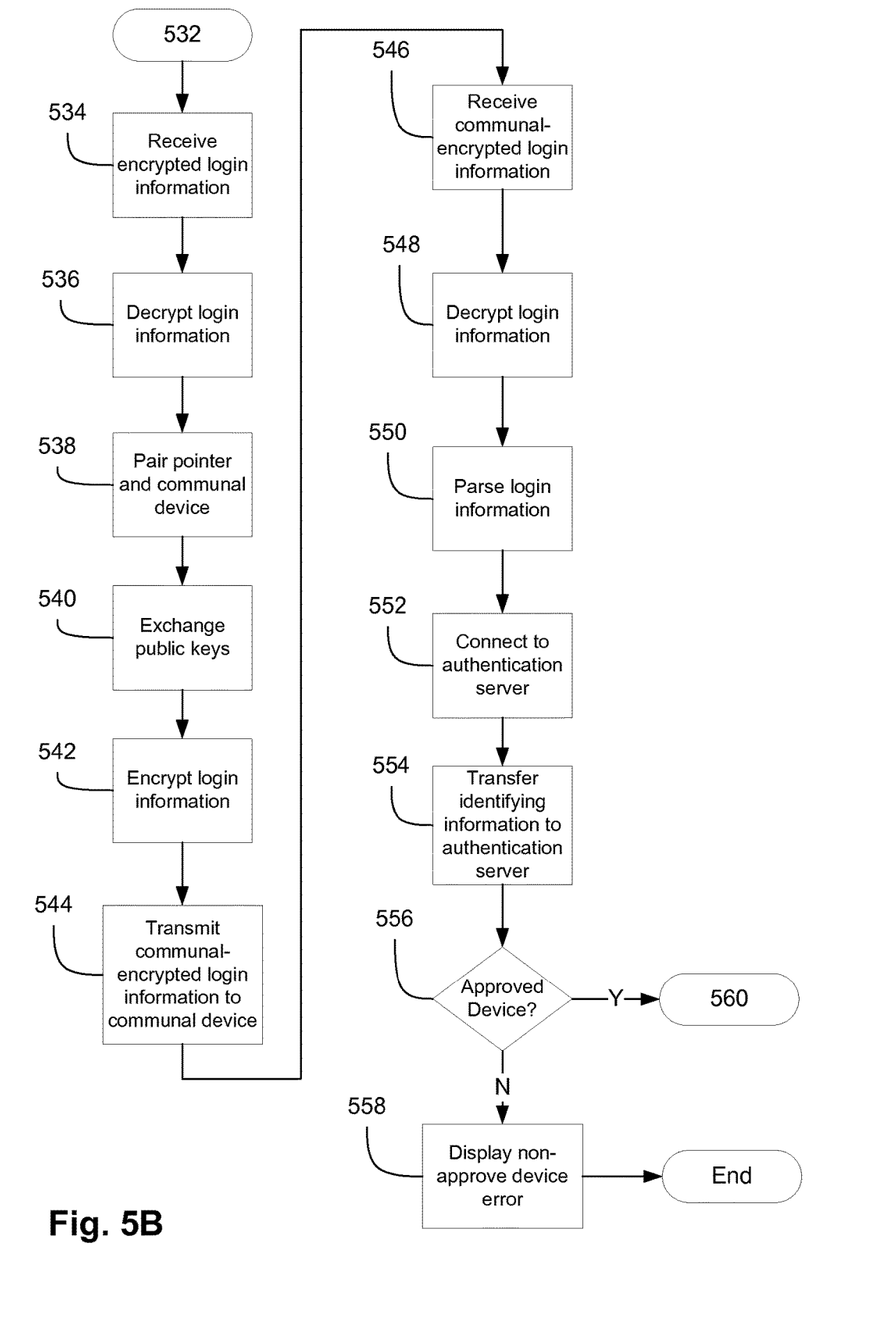

The encrypted login information is received by the NFC antenna 440 and transceiver 420 (step 534) and decrypted using a decryption engine executing on the processor 402 (step 536). The pointer 400 is then brought into contact the NFC antenna 340 of the communal device 300. The pointer 400 and communal device 300 are paired through NFC (step 538). The pointer 400 and communal device 300 exchange public keys over the NFC communication channel (step 540). The encryption engine, executing on the processor 402 of the pointer, encrypts login information using the public key of the communal device 300 (step 542). The communal-encrypted login information is then transferred over the NEC communication channel to the communal device 300 (step 544) where it is received by the communal device (step 546). A decryption engine executing on the processor 302 of the communal device 300 decrypts the communal-encrypted login information using the private key of the communal device 300 (step 548).

The communal device 300 parses the login information to identify the authentication server 120, connection protocol and user information (step 550). The instructions executing on the processor 302 of the communal device 300 attempt a connection over the wired network adapter 324 to the authentication server 120 preferably using a secure connection protocol such as Hypertext Transfer Protocol Secure (HTTPS) or Secure Socket Layer (SSL), File Transfer Protocol Secure (FTPS), Secure Shell (SSH), or other secure or unsecure protocol known in the art (step 552). The communal device 300 transfers its public key, a digital signature, network address, and other identifying information to the authentication server 120 in order to clearly identify itself (step 554). The digital signature may be compared to a permitted digital signatures list prior to further processing to ensure the communal device 300 is an approved device (step 556). If it is not an approved device, then a message is presented on the display of communal device 300 as well as the mobile device 200 (step 558). If approved (step 560, continued in FIG. 5C), the user information is transmitted to the authentication server 120 where the username and password are retrieved, optionally decrypted, and compared to the username and password on file for that account identifier (step 564). If there is a mismatch in the username and password, the authentication server 120 transmits a request to the mobile device 200 using the WiFi or Cellular communication channels instructing the user to retry the authentication with the pointer 400 (step 570).

Figure 5C:
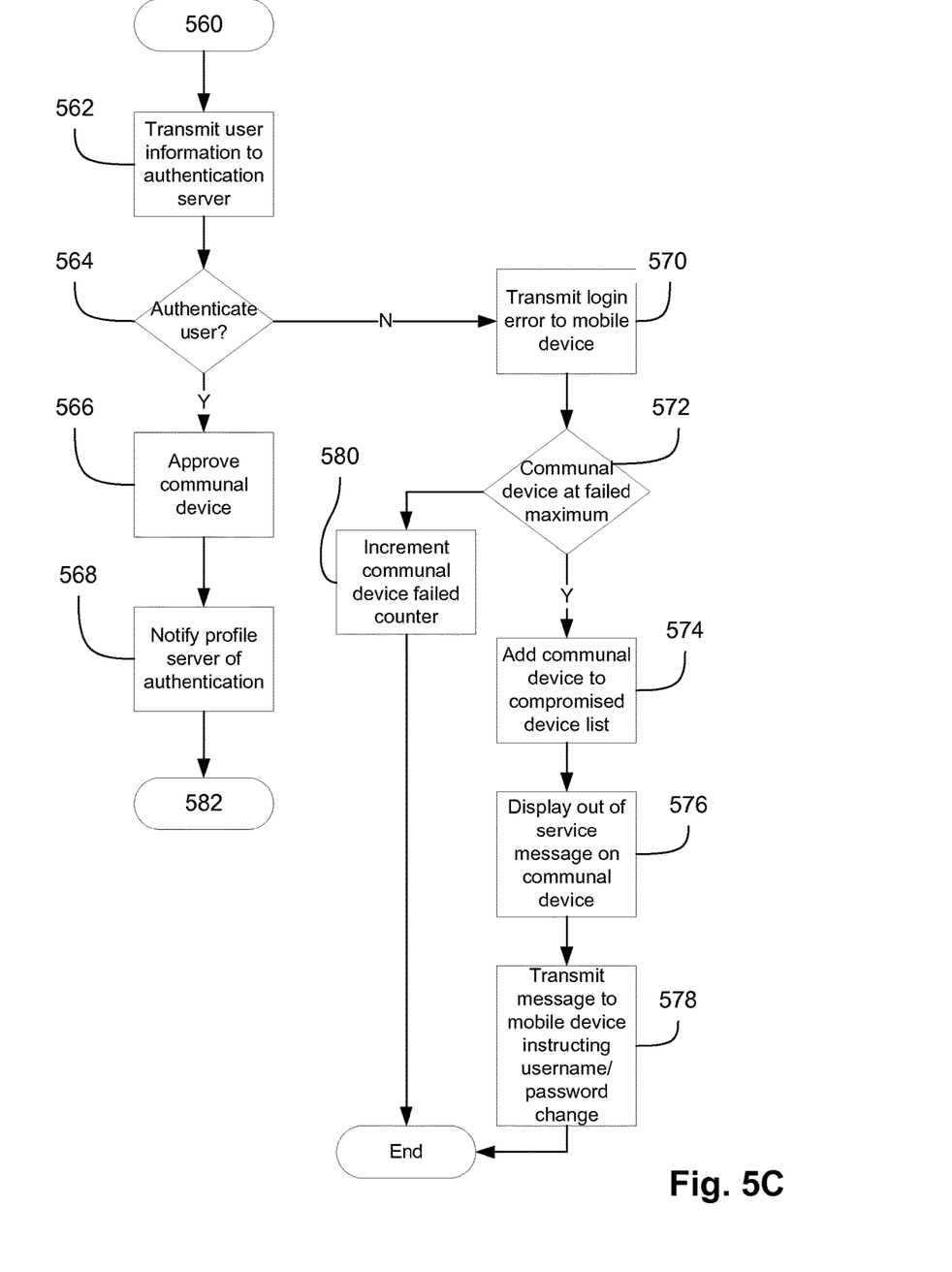

If the communal device 300 has a high number of failed tries (step 572), the communal device 300 is considered to be compromised and is added to a compromised device list (step 574) and the authentication server 120 will no longer accept information from it until it has been serviced. The status of the digital signature is set to an invalid state. A message is displayed on the communal device 300 indicating it is out of service and provides contact information in order to have it promptly serviced (step 576). If the communal device is not at its maximum number of failures, a counter is incremented for that particular device (step 580). If the username and password were not encrypted using the public key of the authentication server 120, then a message is sent to the mobile device 200 instructing them to change their username and/or password (step 570).

If the user is new and does not have a pre-existing account on the authentication server 120, the user may register for a new account. The approval of this registration may be automatic or may be performed by an administrator of the network. The account may be a permanent account or a temporary account. Once an account is generated, the user may enter additional login information to enable access to content prescribed by the content server 124.

If the username: and password match of the account identifier, the communal device 300 is authenticated as an approved device (step 566). The authentication server 120 notifies the profile server 122 that the communal device 300 is authenticated for the mobile device 200 (step 568). The profile server 122 transfers the profile information of the user over the Internet 150 to the wired network adapter 324 of the communal device 300 (step 584). A profile application executing on the processor 302 of the communal device 300 retrieves the profile information and based on the profile information, generates a workspace for the user (step 586). The workspaces may be a personal workspace or a collaborative workspace. Each user would be identified using a uniquely identifiable passive pen similar to that disclosed in U.S. Publication No. 20130100022 to SMART Technologies ULC, herein incorporated by reference. For a personal workspace, there is one master workspace generated and others contribute to that master workspace. This type of workspace may be suitable in an educational environment where the teacher is the primary user of the workspace but may allow others, such as students, to contribute to the master workspace. The teacher may have a pen that may be uniquely identified as having teacher access whereas the students pens may be identified as having limited access or functionality. For a collaborative environment, each user has their own workspace where the users have a uniquely identifiable pointer and are differentiated from each other. In such an environment, the users have generally equal access to their own workspaces but may have limited access to other workspaces.

The workspace may occupy the whole display 312 and user interface of the communal device 300 or be a portion of the display 312 depending on whether or not other users are currently using the communal device 300. The workspace may optionally be displayed proximal to where the pointer 400 contacted the touch surface 306.

Figure 5D:
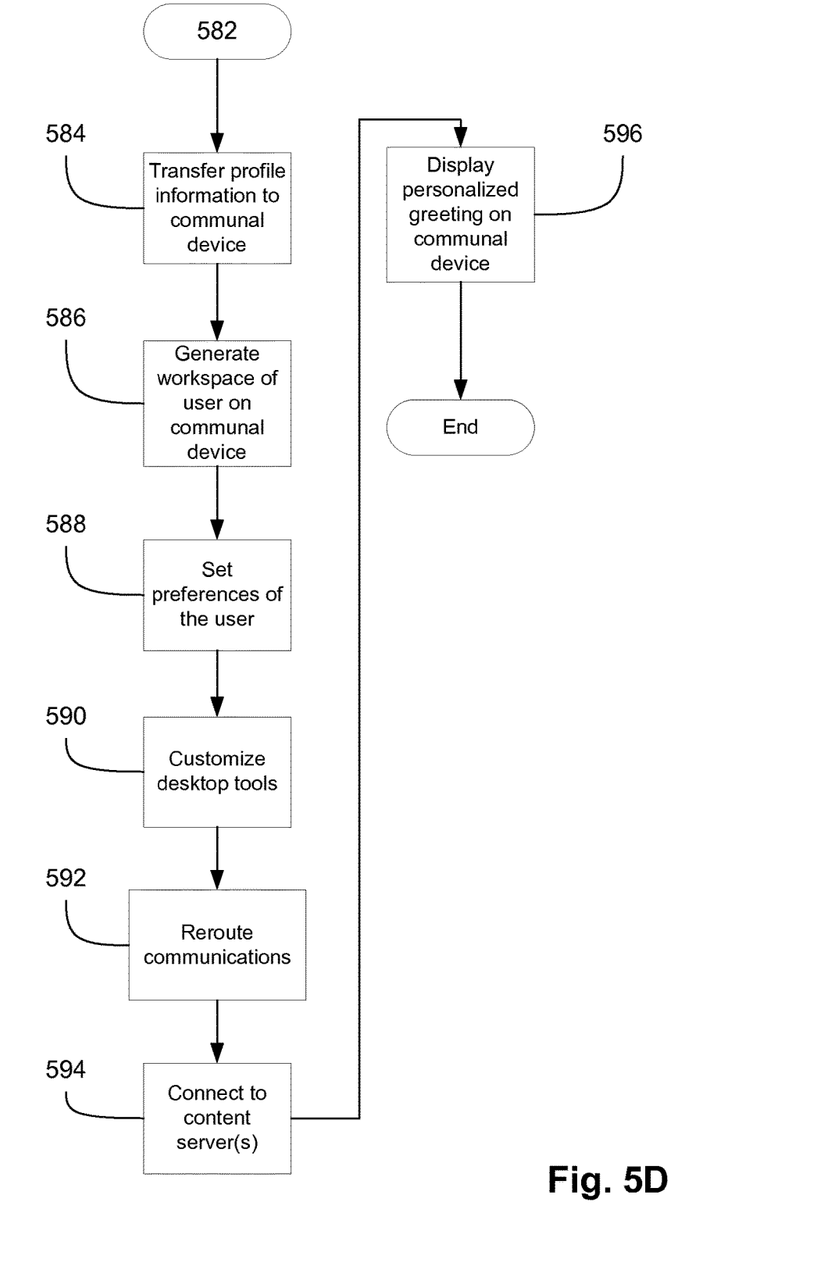

Profile information may contain information about the workspace preferences of the user (step 588). For example, the workspace may be configured for a particular language, left or right handed orientation (and associated palm-reject module), default pen attributes such as pen colour, calligraphic pen, the handwriting recognition engine operating on the processor 302 of the communal device 300 may be optimized for the user's penmanship and continues to learn idiosyncrasies of the user's penmanship. These settings do not have to be communicated to the pointer 400 but rather the communal device 300 modifies how the signals received from the pointer 400 are interpreted. In an educational application, the workspace may be configured specific to a child grade level or the grade a teacher is teaching. The pointer identifier that initiated the workspace is associated with the workspace.

Furthermore, desktop tools may be customized for the particular user (step 590). The communal device 300 may notify the phone system and user tracking systems of the user's current location and update the user's location information in Microsoft Lync®, Skype™, or other location-based service. Additionally, the communal device 300 may check-in using Foursquare, Facebook, Yelp, etc. The phone system may route urgent or all calls to the nearest phone (VoIP or conventional) or alternatively may route the calls to the microphone 308 and speaker 310 of the communal device 300 (step 592). For example, in the instance of a Lync meeting, the user's location is known. The user's VoIP profile information or other communication profile information is retrieved from the content server 124 and the communal device 300 may be configured using this communication profile information. In other systems, the user location may be obtained from a calendar event. If the meeting was an ad-hoc meeting, logging in or authenticating the pen may identify the location of at least the presenter of the meeting. Optionally, the login identifier may include the user's cellular number if there is more than one user with a workspace on the communal device 300, both user's calls will be routed to the nearest phone or communal device 300. When a call is received, the display 312 of the communal device 300 will display the name of the user being called.

In addition to configuring the settings of the workspace, the workspace connects to the content server 124 using usernames and passwords obtained from the profile information (step 594). The content server 124 is a network server or servers that contain the user's documents. Additional settings may be stored in the memory of the content server 124 that are large in size that it would delay the initialization of the workspace. For example, the user may have a customized dictionary or word listing for frequently misspelled words that is not necessary during initialization but is useful during subsequent interaction. The content server 124 may also have the scheduling information for the user. If a meeting is pre-scheduled for that particular communal device 300 by the user, the presentation documents may be automatically opened from the content server 124. The content server 124 may be a dedicated server of which the user has ownership or may be a network storage service such as Dropbox, OneDrive, GoogleDrive, Box net, SharePoint, Citrix, Facebook, Evernote, a local or web-based network storage, etc. The network server and requisite API may be obtained from content server 124.

Once the workspace is properly configured, a personalized greeting message is presented to the user on the display 312 of the communal device 300 (step 596). Subsequent interaction with the workspace and documents therein is automatically synchronized using a synchronization engine executing by the processor 302 of the communal device 300 in conjunction with a synchronization engine executing on the content server 124. The synchronization of documents may be performed using operational transformation guaranteeing that everyone editing the particular document is viewing the same version of the document. The changes are sent from the communal device 300 to the content server 124, and then to the other communal devices 300 that may also be editing the particular document. Each communal device 300 transforms the incoming changes so that they are consistent relative to the local version of the document. The inventor contemplates that other conflict resolution methods may be used for editing of shared documents.

If additional users desire to interact with the communal device 300, each user selects a different pointer 400 and performs the pairing and login procedure as described above. A workspace is generated for each pointer 400 and is presented on the display 312. Ink written by the pointer 400 to the associated workspace is saved to the content server 124 whereas ink written outside of the associated workspace is automatically shared with all workspaces on the communal device 300. The workspaces receive the shared annotations and upload them to the associated account stored on the content server 124. In a shared environment, it may become confusing if each user has the same ink properties. As each pointer has a unique identifier that is reported during interaction with the communal device 300, any digital ink is associated with the unique identifier and the ink may be customized such as using a different colour or style unique to that user's account. In cases where two accounts have their preferences set to the same colour and style, the communal device 300 may automatically select another colour and/or style.

The shared environment also enables workspaces to be shared with one or all of the other users by changing sharing settings within their own workspace. These setting are locked to the particular pointer 400 associated with the workspace in order to prevent other users from changing the sharing settings inadvertently or maliciously. When the workspace is shared with another pointer 400, the ink of that pointer 400 is recorded to the workspace and updated on the content server 124 along with the user identifier. If the workspace is not shared with the pointer 400, then all ink from that pointer 400 is ignored in that workspace and optionally a message notifying the user of the pointer 400 is presented.

If the user (or users) anticipate they will have meet the following morning using the communal device 300, the users can write P.L.O. (abbreviation for Please Leave On) on the communal device 300. This action will prevent others from modifying the display and workspaces of the communal device 300. Alternatively, the P.L.O. may save the state of all workspaces and the shared workspace and close them in order to permit others to use the communal device 300. When the user(s) return and pair their mobile with the communal device, all the workspaces are returned to their previous state.

When the user is finished their session on the communal device 300, the user selects a virtual button in their workspace. On selection of the virtual button, the current state of all documents are saved to the content server 124. Any changes to the workspace settings are saved to the profile server 122. If the user is part of a collaborative session with other users, the user quitting is notified that changes made following the termination will not be saved to the content server 124. The connections to the content server 124 and the profile server 122 are terminated. The processor 302 of the communal device 300 then wipes all record of the user's workspace from the memory 304. Alternatively, the communal device 300 retains all or a portion of the profile information and authentication information in memory 304. The retained profile and authentication information may be used for subsequent logins in order to increase the speed of login or permit logins without NFC pairing the pointer 300 to the mobile device 200.

Although the embodiments described herein pair a mobile device 200 with a pointer 400, the inventor contemplates in an alternative embodiment that the mobile device 200 is the pointer 400 having the matching engine to compare the user's stored biometric template to the current biometric template. The memory 404 of the pointer 400 has the login information comprising: user information, user account identifier, address of the authentication server 120 used to authenticate access to the user's full-profile, network security protocol, network service. The processor 402 of the pointer 400 would encrypt the login information using the public key of the communal device 300. Alternatively, the user may enter a PIN corresponding to the user account identifier.

Although the embodiments described herein pair a mobile device 200 with a pointer 400, the inventor contemplates in an alternative embodiment where the authentication server 120 executes the matching engine to compare the user's stored biometric template to the current biometric template. In such an embodiment, the pointer 400 or the mobile device 200 transfers the biometric template over the Internet 150 to the authentication server 120 where the authentication is made.

In other embodiments, the pointer 400 or the mobile device 200 may store all of the usernames and passwords for the content server(s) 124 and transfer them to the communal device 300.

Alternatively, if the user has forgotten their mobile device 200, the user may enter their account ID into the pointer 400 or communal device 300 and using the biometric sensor in the pointer, login to their workspace.

Although the embodiments described herein pair a mobile device 200 with a pointer 400, the inventor contemplates that other devices may be used for pairing such as, but not limited to, RFID badges, optical scanning tags, magnetic strip cards, for pairing with the pointer 400 directly to the communal device 300. Another alternative would be a pointer-less system where the mobile device 200 is tapped directly to the NFC antenna of the communal device 300.

Although the embodiments described herein show a communal device 300 with an active display, the inventor contemplates that the display may be passive such as, but not limited to, a dry erase board, chalkboard, paper flipchart, or a magnetic drawing board. Any writing on the passive board may be relayed in real-time to the mobile device 200 and/or the content server 124.

Although the embodiments described herein have the communal device 300, mobile device 200, and pointer 400 paired via NFC or Bluetooth, the devices may be virtually paired by reading the same Quick Response (QR) code on the communal device 300 and associated with the content server 124. The QR code may contain the Internet Address and login information therein for a particular account on the content server 124 where each device independently logs into the account. The content server 124 then subsequently synchronizes each of the devices.

Another alternative may have the mobile device 200 identify the pointer 400 using the camera of the mobile device 200. The mobile device 200 may directly transfer the identification information to the authentication server 120. The communal device 300 may also identify the pointer 400 using a camera of the communal device 300. The communal device 300 may transfer the identification information to the authentication server 120. The authentication server 120 would then pair the mobile device 200 with the communal device 300 based on this identification information.

Although the embodiments described herein have the workspace being set up using the profile information by the communal device 300, the inventor contemplates that the workspace is transferred from either the profile server 122 or the content server 124 as a virtual machine which is executed on the communal device 300. Alternatively, the workspace could be a remote desktop running on the content server 124 where the content server 124 is running a virtual machine corresponding to the user's account.

Although the mobile device 200 is described as a smartphone 102, tablet 104, or laptop 106, in alternative embodiments, the mobile device 200 may be built into a conventional pen, a card-like device similar to an RFID car, a camera, or other portable device.

Although the biometric sensor is disclosed in the embodiments herein as being in the pointer 400, the inventor contemplates that the biometric sensor may be located in the mobile device 200 or communal device 300. For example, a fingerprint sensor may be located directly in the touch surface using in-cell optical. Alternative authentication techniques are possible for example the user may pick a series of pictures presented on the display 312 of the communal device 300 that correspond to a password. The pictures may be provided by the authentication server 120, the pointer 400, the mobile device 200, or combination thereof.

Although the embodiments described herein are directed to a biometric template, other identification information or templates are possible such as a user profile template containing a username and password combination or other identifying information or code.

Although the servers 120, 122, 124 are described herein as discrete servers, other combinations may be possible. For example, the three servers may be incorporated into a single server, or there may be a plurality of each type of server in order to balance the server load.

Although the embodiments described herein pair using NFC, the inventor contemplates that other means of communication may be used for pairing and general communication between the devices, such as, but not limited to, WiFi, Bluetooth, WiFi Direct, LTE, 3G, wired Ethernet, Infrared, etc.

The above-described embodiments are intended to be examples of the present invention and alterations and modifications may be effected thereto, by those of skill in the art, without departing from the scope of the invention, which is defined solely by the claims appended hereto.

What is claimed is:

1. A communal computing system comprising:
   a processor;
   a first communication channel;
   a second communication channel;
   a tangible computer-readable memory comprising instructions to configure the processor to:
     receive identification information on contact of a pointer to the first communication channel; the pointer previously authenticated with a mobile device;
     authenticate the communal computing system with an authentication server over the second communication channel using at least a portion of the identification information; and
     receive profile information over the second communication channel from a profile server after the authentication server notifies the profile server of a successful authentication.

2. The communal computing system according to claim 1, wherein the memory further comprises instructions to configure the processor to: generate a workspace on the communal computing system using at least a portion of the profile information.

3. The communal computing system according to claim 1, the memory further comprising instructions to configure the processor to register a pointer identifier with the workspace.

4. The communal computing system according to claim 1, the memory further comprising instructions to configure the processor to automatically log into at least one content server using a portion of the profile information and accessing user content from the at least one content server.

5. The communal computing system according to claim 1, wherein the identification information comprises biometric data from a biometric sensor located on the pointer.

6. The communal computing system according to claim 5, wherein the biometric data is processed to generate a biometric template.

7. The communal computing system according to claim 1, wherein the first communication channel is a wireless communication channel.

8. The communal computing system according to claim 7, wherein the wireless communication channel is a contact communication channel.

9. The communal computing system according to claim 1, wherein the second communication channel is a wired communication channel.

10. A method for authentication comprises:
    receiving identification information on contact of a pointer to a mobile device to a first communication channel; the pointer previously authenticated with the mobile device;
    authenticating a communal computing system with an authentication server over a second communication channel using at least a portion of the identification information from a profile server; and
    receiving profile information over the second communication channel from the profile server after the authentication server notifies the profile server of a successful authentication.

11. The method for authentication according to claim 10, further comprises generating a workspace on the communal computing system using at least a portion of the profile information.

12. The method for authentication according to claim 11, further comprises registering a pointer identifier with the workspace.

13. The method for authentication according to claim 10, further comprises automatically logging into at least one content server using a portion of the profile information and accessing user content from the at least one content server.

14. The method for authentication according to claim 10, wherein the identification information comprises biometric data from a biometric sensor located on the pointer.

15. The method for authentication according to claim 14, wherein the biometric data is processed to generate a biometric template.

16. The method for authentication according to claim 10, wherein the first communication channel is a wireless communication channel.

17. The method for authentication according to claim 16, wherein the wireless communication channel is a contact communication channel.

18. The method for authentication according to claim 10, wherein the second communication channel is a wired communication channel.

* * * * *